(12) United States Patent
Liang (10) Patent No.: US 9,886,519 B2
(45) Date of Patent: Feb. 6, 2018

(54) METHODS AND SYSTEMS FOR ADJUSTING WEBPAGE LAYOUT

(71) Applicants: UC MOBILE LIMITED, Beijing (CN); GUANGZHOU UCWEB COMPUTER TECHNOLOGY CO., LTD, Guangzhou (CN)

(72) Inventor: Jie Liang, Guangzhou (CN)

(73) Assignees: UC MOBILE LIMITED, Beijing (CN); GUANGZHOU UCWEB COMPUTER TECHNOLOGY CO., LTD., Guangzhou (CN)

( * ) Notice: Subject to any disclaimer, the term of this patent is extended or adjusted under 35 U.S.C. 154(b) by 478 days.

(21) Appl. No.: 14/130,463

(22) PCT Filed: Dec. 19, 2012

(86) PCT No.: PCT/CN2012/086935
§ 371 (c)(1),
(2) Date: Jun. 11, 2014

(87) PCT Pub. No.: WO2013/097638
PCT Pub. Date: Jul. 4, 2013

(65) Prior Publication Data
US 2014/0298156 A1    Oct. 2, 2014

(30) Foreign Application Priority Data
Dec. 29, 2011 (CN) .......................... 2011 1 0451006

(51) Int. Cl.
*G06F 17/00*     (2006.01)
*G06F 17/30*     (2006.01)
(Continued)

(52) U.S. Cl.
CPC ...... *G06F 17/30896* (2013.01); *G06F 17/211* (2013.01); *G06F 17/25* (2013.01); *G06F 17/30905* (2013.01)

(58) Field of Classification Search
USPC .................................. 715/200, 234, 238, 273
See application file for complete search history.

(56) References Cited

U.S. PATENT DOCUMENTS 6,304,820 B1* 10/2001 Goto ..................... G06F 3/0481
340/990
7,594,168 B2* 9/2009 Rempell ................... G06F 8/20
715/234
(Continued)

FOREIGN PATENT DOCUMENTS

CN       1630398 A       6/2005
CN       1867125 A       11/2006
(Continued)

*Primary Examiner* — Stephen Hong
*Assistant Examiner* — Gregory Vaughn
(74) *Attorney, Agent, or Firm* — Anova Law Group, PLLC (57) ABSTRACT

A method and system for adjusting webpage layout are disclosed. The method includes calculating a width for displaying an image on a webpage; determining whether the image is inserted in a segment of text of the webpage; and adjusting the size of the image display based on a mobile terminal's screen width and the width for displaying the image, if the image is inserted in the segment of text of the webpage. The disclosed methods and systems adjust the images on a webpage based on the width of the image and the screen width of a mobile terminal. As such, an adjusted webpage can be viewed by scrolling up and down the display screen. In addition, a user's online experience may be further improved by adjusting the images on the webpage to be left justified and aligned with the text on the page. A (Continued)

user does not need to scroll horizontally (e.g., from left to right) to read the webpage including the images.

17 Claims, 9 Drawing Sheets

(51) Int. Cl.
*G06F 17/21* (2006.01)
*G06F 17/25* (2006.01)

(56) References Cited

U.S. PATENT DOCUMENTS

| | | | | |
|---|---|---|---|---|
| 7,880,752 | B2* | 2/2011 | Torimoto | H04N 1/00209 345/2.3 |
| 8,086,958 | B2* | 12/2011 | Tokunaga | G06F 17/211 715/205 |
| 8,443,282 | B2* | 5/2013 | Kikuchi | G06F 17/248 715/243 |
| 8,933,962 | B2* | 1/2015 | Sun | G06F 17/30265 345/473 |
| 2004/0255244 | A1 | 12/2004 | Filner et al. | |
| 2007/0132783 | A1* | 6/2007 | Lim | G06T 11/60 345/629 |
| 2008/0033996 | A1* | 2/2008 | Kesari | G06F 17/212 |
| 2008/0072139 | A1* | 3/2008 | Salinas | G06F 17/30905 715/238 |
| 2008/0120393 | A1* | 5/2008 | Chen | G06F 17/30905 709/217 |
| 2008/0215963 | A1* | 9/2008 | Kanemitsu | G06F 17/217 715/238 |
| 2008/0301545 | A1* | 12/2008 | Zhang | G06F 17/212 715/235 |
| 2009/0138798 | A1* | 5/2009 | Fan | H04M 1/72561 715/238 |
| 2009/0198538 | A1* | 8/2009 | Gupta | G06Q 30/02 705/14.64 |
| 2010/0211551 | A1* | 8/2010 | Ryu | H04L 12/583 707/687 |
| 2010/0299702 | A1* | 11/2010 | Lo | G06Q 20/123 725/39 |
| 2013/0251051 | A1* | 9/2013 | Ikai | H04N 19/0089 375/240.29 |
| 2014/0029615 | A1* | 1/2014 | Baldwin | H04L 67/306 370/392 |

FOREIGN PATENT DOCUMENTS

| | | |
|---|---|---|
| CN | 1967522 A | 5/2007 |
| CN | 101535938 A | 9/2009 |
| CN | 101539934 A | 9/2009 |
| CN | 101950239 A | 1/2011 |
| CN | 102591853 A | 7/2012 |
| JP | 2002007269 A | 1/2002 |

* cited by examiner

Before the arrival of the next week, we can not determine everything. Now it is said that the Facebook's long-awaited iPad app will finally be unveiled at Apple's Oct. 4 media event. WangYi Technologies will do real-time tracking reports. (Reporter: Lu Qing)

METHODS AND SYSTEMS FOR ADJUSTING WEBPAGE LAYOUT

CROSS-REFERENCES TO RELATED APPLICATIONS

Related Applications

This application is based upon and claims the benefit of priority from Chinese Patent Application No. 201110451006.7, filed on Dec. 29, 2011, the entire contents of which are incorporated herein by reference.

FIELD OF THE INVENTION

The present disclosure relates to mobile communication technologies and, more particularly, to methods and systems for adjusting the layout for webpages with embedded images.

BACKGROUND

In recent years, using mobile terminals to browse news through web portals such as sina.com has become a trend. However, when browsing webpages using a mobile terminal because the screen size of the mobile terminal is often limited, many large images on a webpage cannot be displayed on one screen. As such, a user may often need to scroll vertically and horizontally to view a complete image, which undermines the online user experience.

The problem with displaying images on a webpage is obvious when a user is reading a news article with embedded images. The text content on a webpage can be arranged according to the screen width. As such, large segments of text can be viewed by scrolling up and down the screen. A user does not need to scroll horizontally (e.g., from left to right) to view the text. However, when there are images inserted into the body of the text, the situation is different. When a user views an image, because the image size is often larger than the screen size, the user would have to scroll left and right to view the complete image. Often, the user also could not view the complete image on one screen. In addition, the user's online experience may be further impacted when an image is centered on a page. In that case, the mobile terminal may display the text left justified on the screen and leave the image at the center of the page. The user may need to scroll a long distance to the right of the screen to view the image. Even worse, the user may only see a blank section of the page without realizing that there is an mage on the right side of the screen and thus may completely ignore the image.

The disclosed method and system are directed to solve one or more problems set forth above and other problems.

BRIEF SUMMARY OF THE DISCLOSURE

Embodiments consistent with the present disclosure provide a method, system, mobile terminal, or a server for adjusting webpage layout. Embodiments consistent with the present disclosure provide improved user experience by providing user friendly webpage layouts.

One aspect of the present disclosure provides a method for adjusting webpage layout. The method includes calculating a width for displaying an image on a webpage, determining whether the image is inserted in a segment of text of the webpage, and, if the image is inserted in the segment of text of the webpage, adjusting the size of the image display based on a mobile terminal's screen width and the width for displaying the image.

In embodiments consistent with the present disclosure, the method for adjusting webpage layout may further include determining whether the width for displaying the image is different from a default value and determining whether the screen width of the mobile terminal has changed.

In embodiments consistent with the present disclosure, the method for adjusting webpage layout may further include determining whether image information includes an attribute that is needed for actively displaying the image.

In embodiments consistent with the present disclosure, the method for adjusting webpage layout may further include determining whether a parent node of the image is a node representing text content and determining whether at least two brother nodes of the image are nodes representing other contents.

In embodiments consistent with the present disclosure, the method for adjusting webpage layout may further include adjusting the size of the image display based on whether the width of the image display is in a pre-determined range.

In embodiments consistent with the present disclosure, the method for adjusting webpage layout may further include setting a width of the image display based on the mobile terminal's screen width and a fixed number of pixels, and setting a height of the image display based on the width of the image display.

In embodiments consistent with the present disclosure, the method for adjusting webpage layout may further include adding a label to the image display to force the image display to be left justified.

Another aspect of the present disclosure provides a system for adjusting webpage layout. The system includes a calculation unit configured to calculate a width for displaying an image on a webpage, a first determination unit configured to determine whether the image is inserted in a segment of text of the webpage, and a size adjustment unit configured to adjust the size of the image display based on a mobile terminal's screen width and the width for displaying the image, if the image is inserted in a segment of text of the webpage.

In embodiments consistent with the present disclosure, the first determination unit of the system for adjusting webpage layout is further configured to determine whether the width for displaying the image is different from a default value, and to determine whether the screen width of the mobile terminal has changed.

In embodiments consistent with the present disclosure, the first determination unit of the system for adjusting webpage layout is further configured to determine whether image information includes an attribute that is needed for actively displaying the image, and determine whether a parent node of the image is a node representing text content and whether at least two brother nodes of the image are nodes representing other contents.

In embodiments consistent with the present disclosure, the system for adjusting webpage layout further includes a second determination unit configured to whether a width of the image display is in a pre-determined range.

In embodiments consistent with the present disclosure, the size adjustment unit is further configured to set a width of the image display based on the mobile terminal's screen width and a fixed number of pixels, and to set a height of the image display based on the width of the image display.

In embodiments consistent with the present disclosure, the system for adjusting webpage layout further includes a label addition unit configured to add a label to the image display to force the image display to be left justified.

Another aspect of the present disclosure provides a mobile terminal that contains a system for adjusting webpage layout. The system includes a calculation unit configured to calculate a width for displaying an image on a webpage, a first determination unit configured to determine whether the image is inserted in a segment of text of the webpage, and a size adjustment unit configured to adjust size of the image display based on a mobile terminal's screen width and the width for displaying the image if the image is inserted in a segment of text of the webpage.

Embodiments consistent with the present disclosure adjust the images on a webpage based on the display width of the image and the screen width of a mobile terminal. As such, an adjusted webpage can be viewed by scrolling up and down the display screen. In addition, a user's online experience may be further improved by adjusting the images on a webpage to be left justified on the screen and aligned with the text on the page. A user does not need to scroll horizontally (e.g., from left to right) to read the webpage including the images.

Other aspects of the present disclosure can be understood by those skilled in the art in light of the description, the claims, and the drawings of the present disclosure.

BRIEF DESCRIPTION OF THE DRAWINGS

To illustrate embodiments of the invention, the following are a few drawings illustrating embodiments consistent with the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

Figure 1:
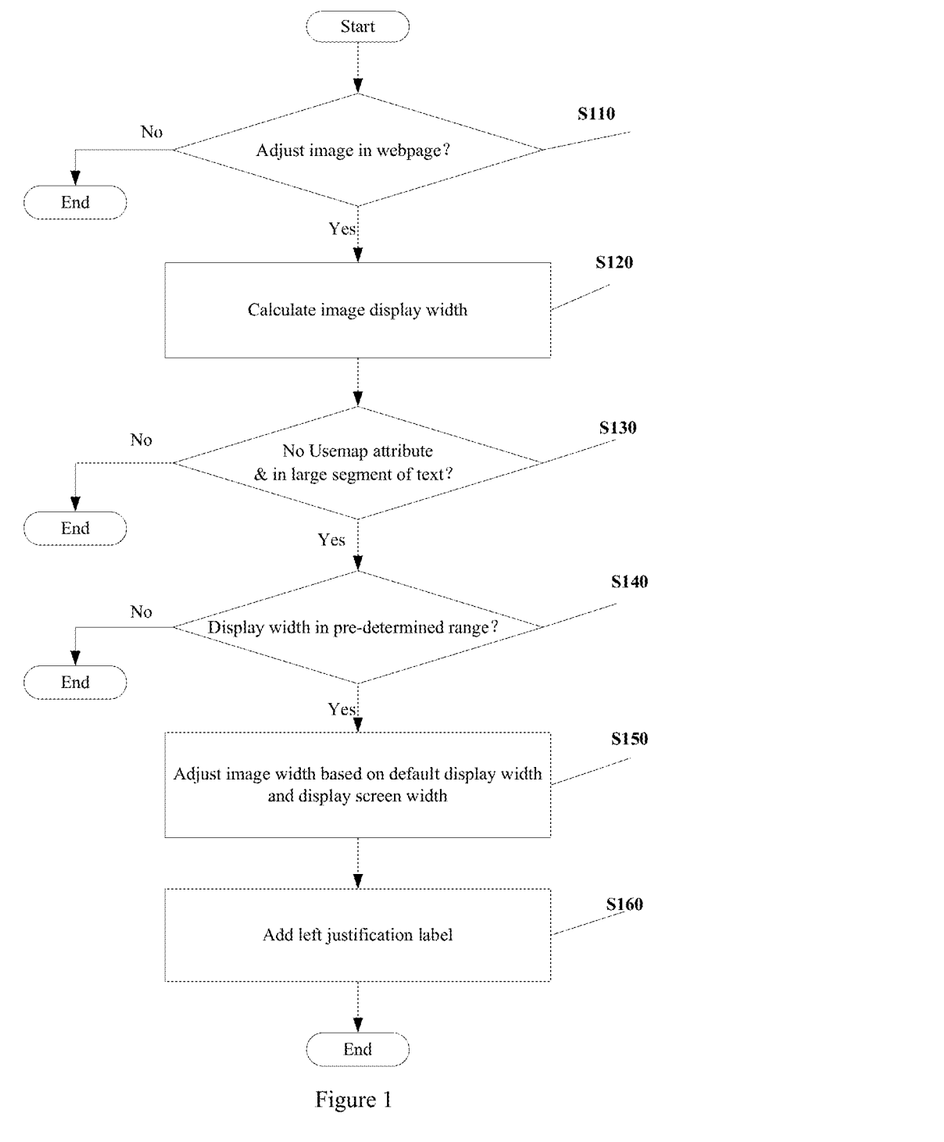
FIG. 1 is a flowchart of a method for adjusting the layout of a webpage with inserted images implemented by an exemplary embodiment consistent with the present disclosure.

FIG. 1 shows a flow chart of a method for adjusting the layout of webpages with inserted images consistent with the present disclosure.

As shown in FIG. 1, first, in step S110, the system adjusting the layout of webpages may determine whether the images in a webpage need to be adjusted. For example, the system may determine whether the size of the screen display on a mobile terminal is changed, or whether the width of a screen display is changed. If the screen display size is changed (e.g., the display area is changed to a smaller or larger size) then the system may adjust the images on the webpage. Also, if the width of the mobile terminal's screen display changes, such as when the mobile terminal changes from a vertical screen display to a horizontal screen display, or vice versa, the system may determine to adjust the images on the webpage. If the system determines that the webpage does not need to be adjusted, then the process terminates.

In the system determines to adjust the layout of the webpage, in step S120, the system may calculate the width of the display for the images on the webpage. For example, the system may traverse a DOM (Document Object Model) tree to decide the layout of a webpage. The system may compute the display area for each node on the DOM tree. The display area may be a default size of the image, which may be the same size for rendering the image onto a desktop browser. The system may then determine the width of the image based on the description of the webpage.

In step S130, the system for adjusting the layout of webpages may determine whether the content of an image includes attributes that is needed to actively display the image and whether the inserted image is inserted in a large segment of text. An exemplary attribute that is needed for actively displaying inserted images may be the usemap attribute. If an image includes this type of attributes, then any size adjustment made to the image may break logics that may trigger certain events, such as certain events triggered by mouse clicks.

Whether an image is inserted in a large segment of text may be determined as follows. In one example, the system may determine whether a parent node of an image document node is a node for text, such as checking whether a parent node includes a label representing a paragraph of text, such as label <p> or <font>. The system may also determine whether the brother nodes (of the image DOM node) include at least two other content nodes, such as a text node, a <br> node, or an image node. If a parent node of a document node is a node for text including a label <p> or <font>, or if the brother nodes (of the image DOM node) include at least two other content nodes, such as a text node, a <br> node, or an image node, then the system may determine that an image is inserted into a large segment of text. If not, the system may determine that the image is not inserted into a large segment of text.

If an image includes an attribute that is needed to actively display the image, or the image is not inserted into a large segment of text, that is, the results of step S130 is negative, the process terminates. If an image does not include an attribute that is needed to actively display the image or the image is inserted into a large segment of text, that is, the result of step S130 is positive, the system executes step S140.

In step S140, the system may determine whether the default display width of the image is within a pre-determined range. The pre-determined range may be based on a mobile terminal's screen width. Often, for vertical screen display, the pre-determined range may be less than 950 pixels or more than 120 pixels. Based on the pre-determined range, the system may filter out small images or large website logos or advertisements. When the mobile terminal's screen width changes, the pre-determined range also changes. For example, when a mobile terminal changes from a vertical display to a horizontal display, the lower limit of the pre-determined range (950 pixels) may be higher.

If an image's default display width is within the pre-determined range, the system may execute step 150. If not, the process terminates.

In step S150, based on the mobile terminal's screen width, the system for adjusting the layout of webpages may adjust the display size of the image. In one example, adjusting the size of the display may include the following steps. The system may set the image display width to the mobile terminal's screen width subtracting a fixed number of pixels. The fixed number of pixels may be set according to the needs of the users or the system. For example, the fixed number may be 20 pixels.

It is apparent that the above example is descriptive of, and does not limit, the present disclosure. Persons of ordinary skill in the art may use other methods to adjust the layout of an image based on the image's display size and the mobile terminal's screen size. It should be noted that the height of the image display is adjusted in proportion to the width of the display. Scaling the original image down and then enlarge the scaled down version (without considering the proportions) may cause distortions of the original image.

After the system adjust the image display size as described above, the system for adjusting webpage layout may further execute step S160. In step 160, the system may add a label to the node of the image to indicate that the image should be left justified when displayed. Adding this label means adding an attribute to the image's DOM tree node. When the system prepares the image for display, it would encounter this left justification label. The system may then ignore other relevant attributes such as text-align, indent, margin, to ensure the image is left justified and aligned with the relevant left justified text.

In some embodiments, between step S150 and S160, the system may determine whether an image on a webpage is properly centered. If the image is centered, the system may execute step S160. If not, the system may return to step S150 to adjust the size of screen layout until the image is properly centered.

As shown in FIG. 1, embodiments consistent with the present disclosure adjust the screen size of webpage displays for webpages with inserted images. It should be noted that the examples above is descriptive, not limiting, of the present disclosure. Persons of ordinary skill in the art may modify the examples in the present disclosure. For example, in one embodiment, the system for adjusting webpage layout may omit step S110. That is, the system may start calculating and adjusting the screen display when it is already determined that the webpage display needs to be adjusted. In another example, the system may omit step S140. That is, the system may adjust the screen display of all images satisfying the conditions in the previous steps. In another example, if the webpage is already left justified, the system may omit step S160.

Below are a few examples of webpages rendered by embodiments consistent with the present disclosure.

Figure 2:
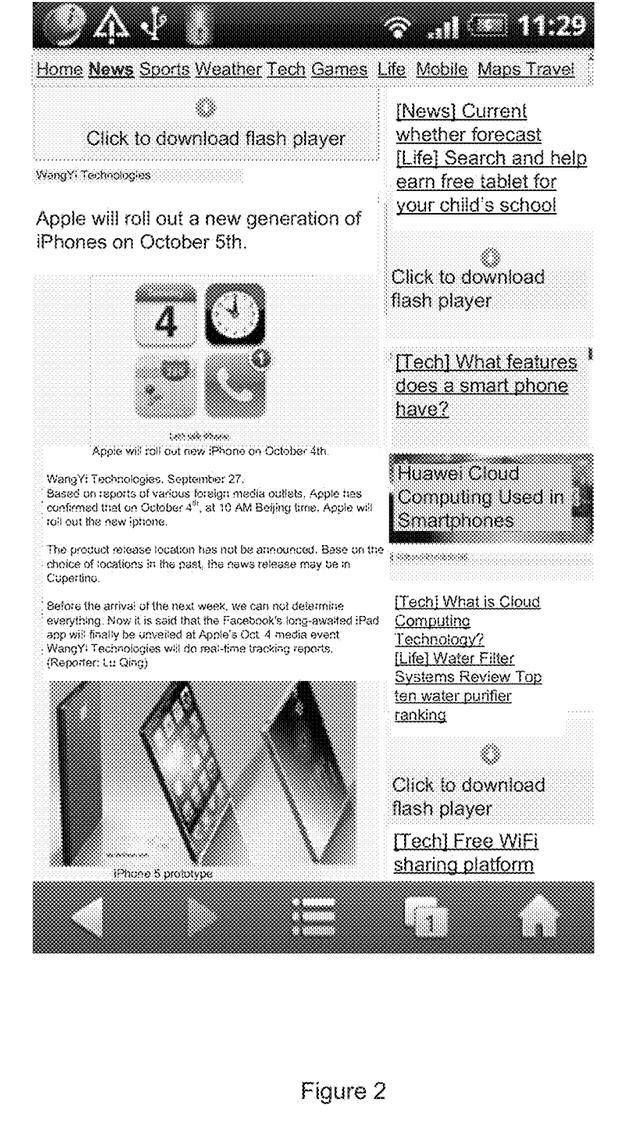
FIG. 2 is an exemplary display of a webpage with inserted images.
Figure 3:
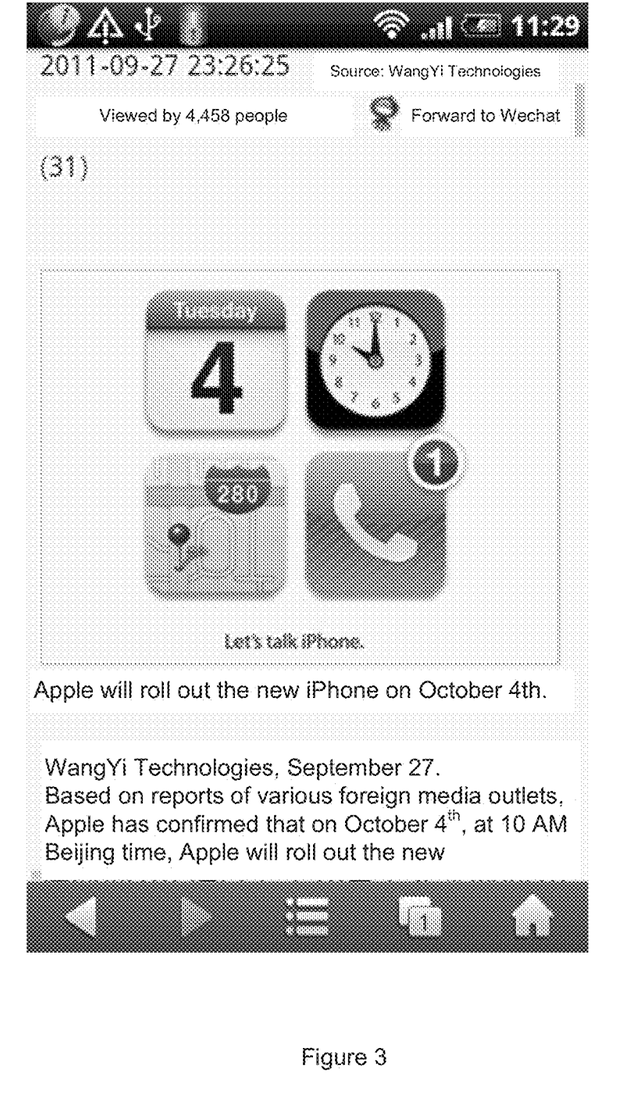
FIG. 3 is an exemplary display of a webpage with inserted images rendered by an exemplary embodiment consistent with the present disclosure.
Figure 4:
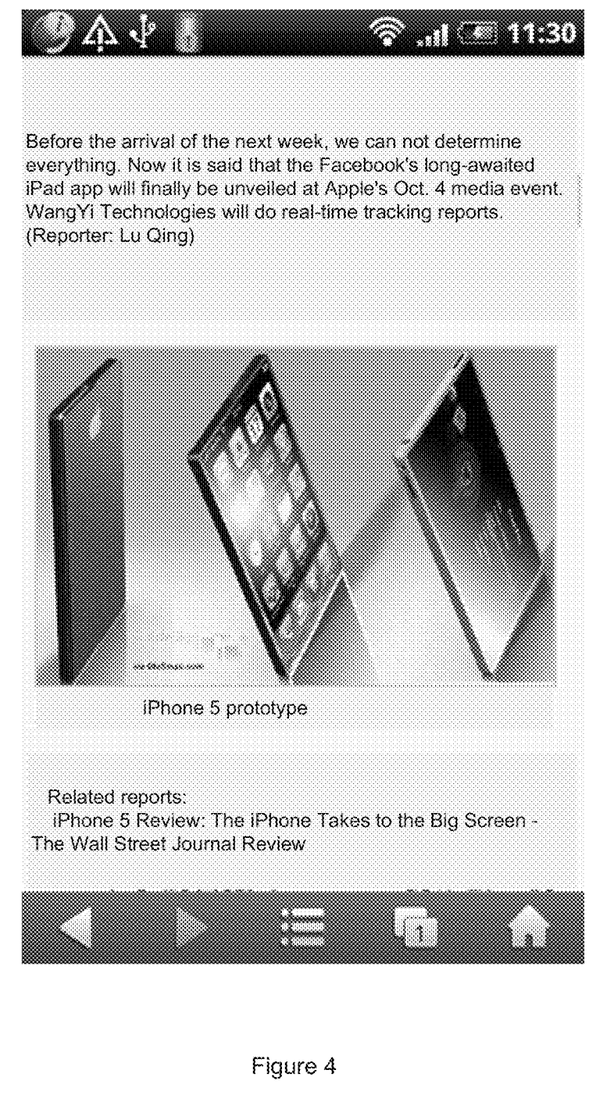
FIG. 4 is another exemplary display of a webpage with inserted images rendered by an exemplary embodiment consistent with the present disclosure.
Figure 5:
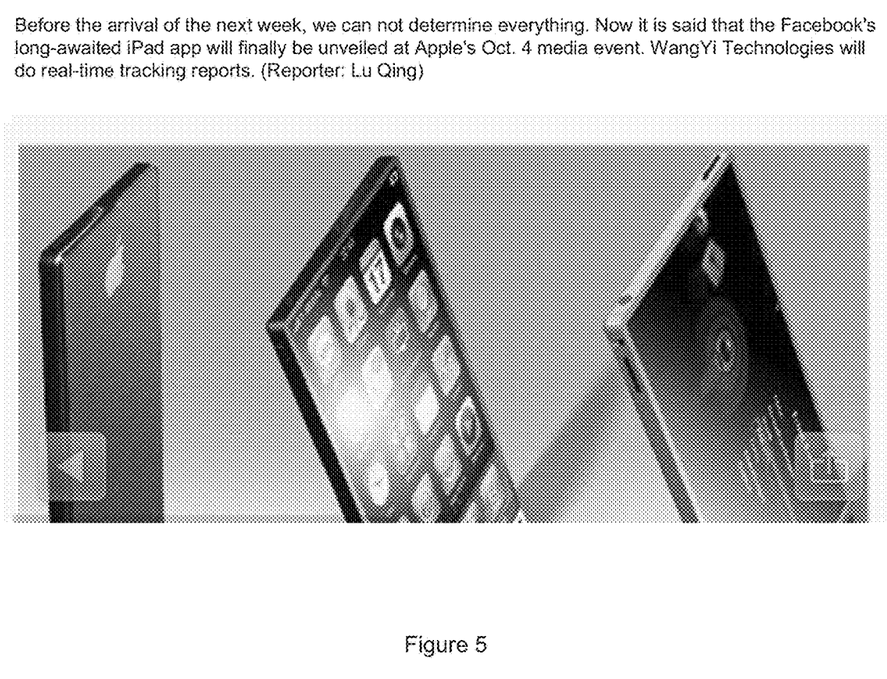
FIG. 5 is another exemplary display of a webpage with inserted images rendered by an exemplary embodiment consistent with the present disclosure.

FIG. 2 shows a webpage presented by embodiments consistent with the present disclosure. In FIG. 3, the system for adjusting webpage layout renders a webpage based on the webpage in FIG. 2 with the display area enlarged (zooming in). FIG. 4 shows the portion of the webpage below the portion shown in FIG. 3 after the system for adjusting webpage layout adjusting the webpage in FIG. 2. In FIG. 5, the system for adjusting webpage layout renders a webpage based on the webpage in FIG. 2 with a wider mobile terminal screen (switching from a vertical screen display to a horizontal display).

FIG. 2 shows a news article. The article includes two images. Both images are large. If the two images are enlarged by the default ratio, neither can be displayed properly on a screen of a mobile terminal.

In FIG. 3, a user may enlarge the area around the first image of the article. The zoom-in process may trigger the system for adjusting webpage layout to adjust the webpage. The system may adjust the image size consistent with the present disclosure. In this case, the image sizes are reduced. The display is changed from center to left justify to properly align with the text.

Once a user scroll down from FIG. 3, he will reach the second image in the news article as shown in FIG. 4. The size of the second image is also reduced. The second image is left justified. The scrolling motion from FIG. 3 to FIG. 4 does not trigger adjustments to the webpage layout. The adjustment of the webpage layout is complete when the user finishes the zoom-in motion.

FIG. 5 shows the webpage of FIG. 4 once a user switches from a vertical screen display to a horizontal display. Because the screen width is changed, the system for adjusting webpage layout may adjust the webpage layout including the display of the text and the images on a page. As shown in FIG. 5, the image displayed on a horizontal screen is larger than the display on a vertical screen, adjusting for the wider screen.

Figure 6:
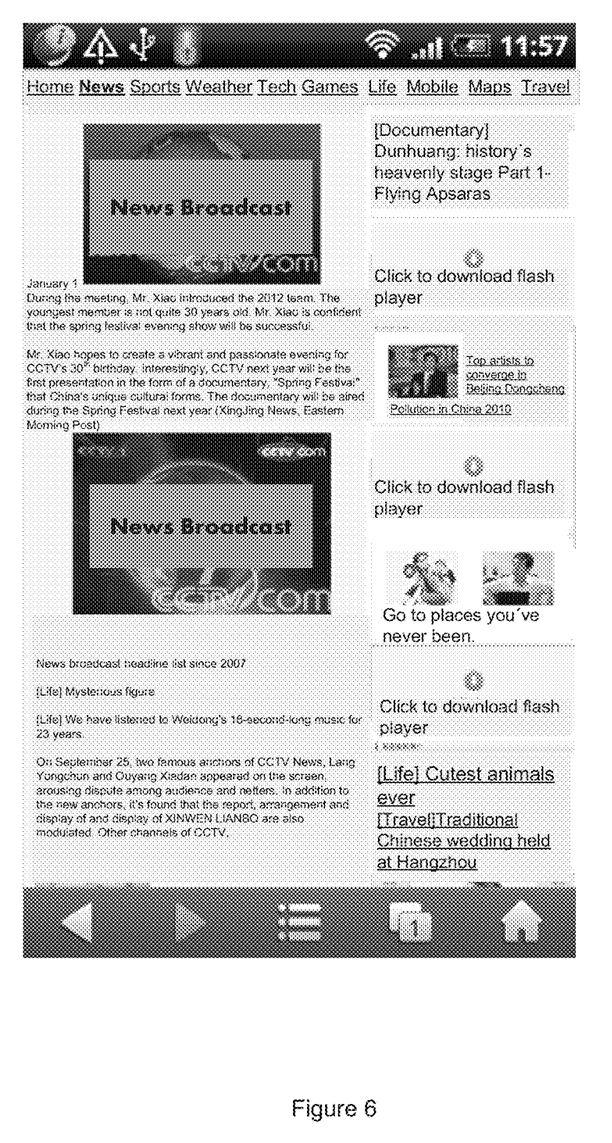
FIG. 6 is a another exemplary display of a webpage with inserted images rendered by an exemplary embodiment consistent with the present disclosure.
Figure 7:
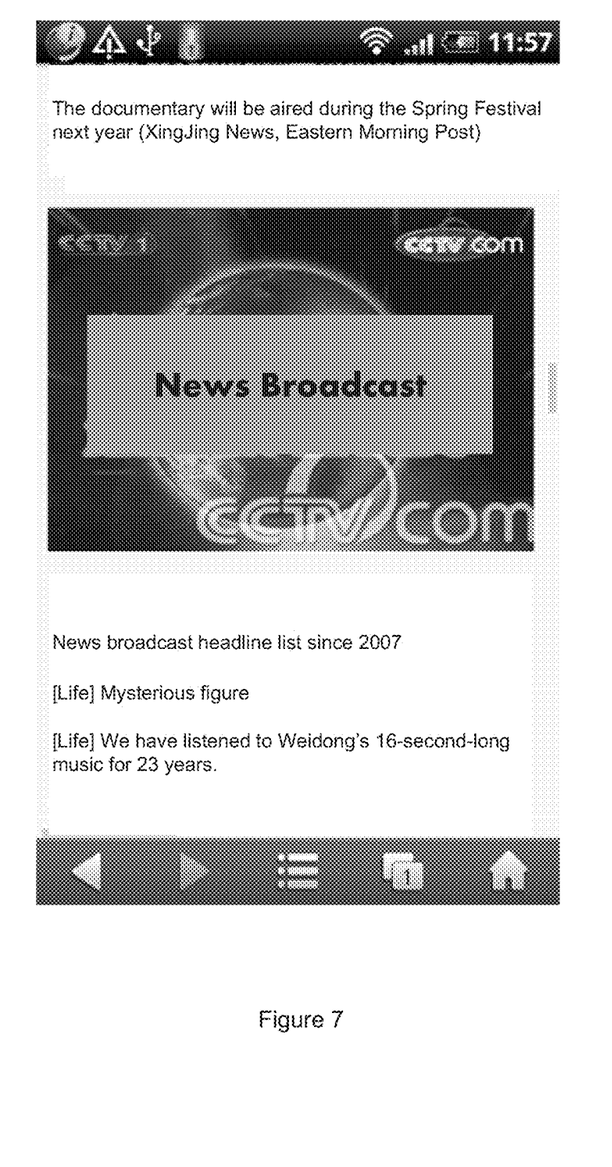
FIG. 7 another exemplary display of a webpage with inserted images rendered by an exemplary embodiment consistent with the present disclosure.
Figure 8:
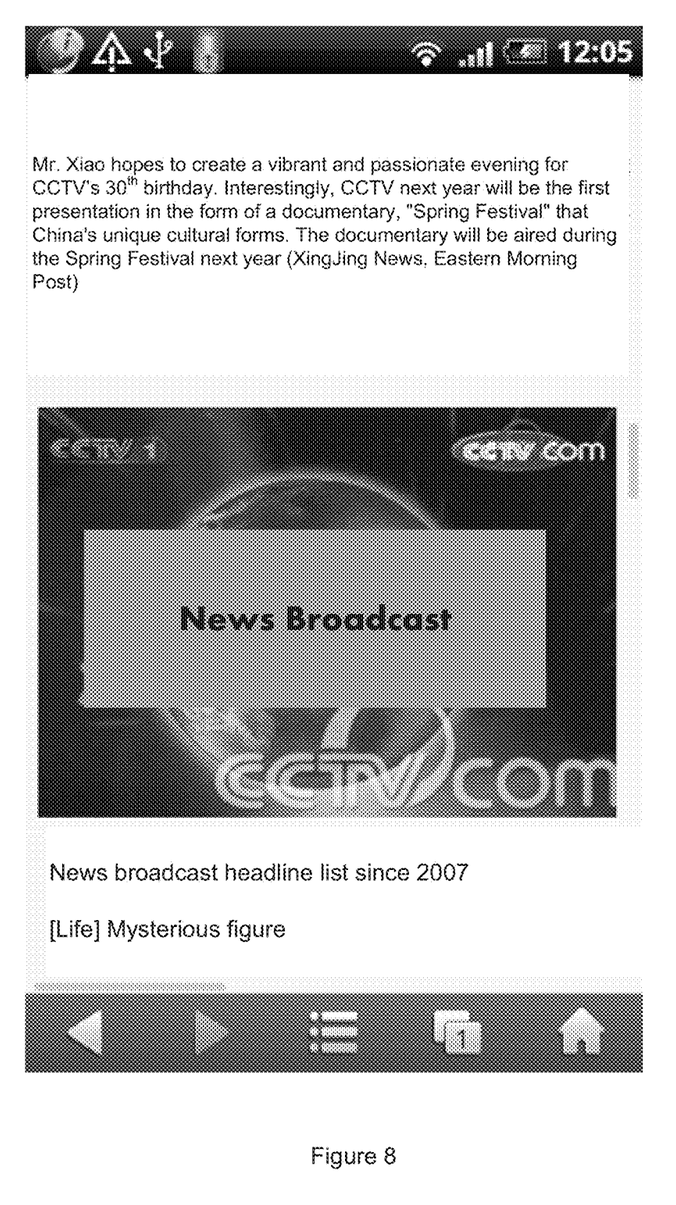
FIG. 8 another exemplary display of a webpage with inserted images rendered by an exemplary embodiment consistent with the present disclosure.

FIG. 6 is another exemplary display of a webpage consistent with the present disclosure. FIG. 7 is a webpage display enlarging an image in the webpage of FIG. 6 consistent with the present disclosure. FIG. 8 is a webpage display after reducing the size of the display in FIG. 7, consistent with the present disclosure.

FIG. 6 shows another news article. FIG. 7 shows a webpage with an enlarged image displayed on the screen. FIG. 8 shows a display with reduced page size to show more text on the screen. In FIG. 8, all images are adjusted to the proper screed width.

As shown in FIGS. 1 to 8, the system for adjusting webpage layout may use software, hardware, or a combination thereof, to adjust the size of webpage displays including the size of the images on the webpage.

Figure 9:
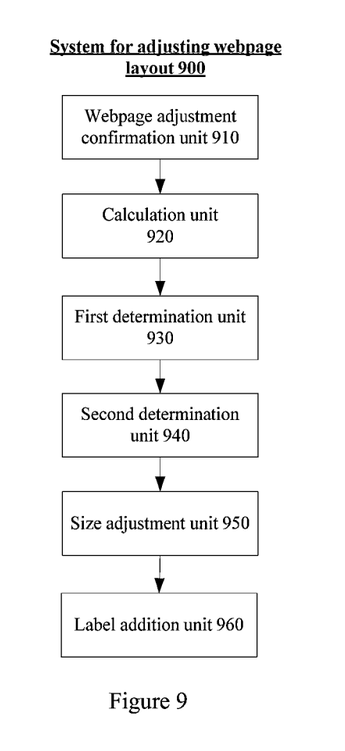
FIG. 9 illustrates a block diagram of an exemplary computer system consistent with the disclosed embodiments.

FIG. 9 shows a block diagram of a system/apparatus 900 for adjusting webpage layout consistent with the present disclosure.

In FIG. 9, the system for adjusting webpage layout may include a webpage adjustment confirmation unit 910, a calculation unit 920, a first determination unit 930, a second determination unit 940, a size adjustment unit 950, and a label addition unit 960.

The webpage adjustment confirmation unit 910 may determine whether the system needs to adjust the images in a webpage. For example, the webpage adjustment confirmation unit 910 may determine whether the screen size of a mobile terminal has changed, or whether the screen width has changed. When there is a change in the screen size, the webpage adjustment confirmation unit 910 may determine that the webpage display, including the images on the webpage, needs to be adjusted. In addition, when there is a change in the screen width (e.g., from a vertical screen display to a horizontal display), the webpage adjustment confirmation unit 910 may determine that the webpage display, including the images on the webpage, needs to be adjusted. Alternatively, a system for adjusting webpage layout may be implemented without the webpage adjustment confirmation unit 910. For example, the system for adjusting webpage layout may only be triggered by another system when it has determined that a webpage display needs to be adjusted. Alternatively, the system for adjusting webpage layout may adjust webpage displays regardless of screen size changes.

The calculation unit 920 may calculate the webpage display width. The examples discussed above in relation to FIGS. 1-9 exemplify such calculations.

The first determination unit 930 may determine whether an image is inserted into a large segment of text when the image information does not include any of the attributes needed for actively displaying the webpage content.

Whether an image is inserted in a large segment of text may be determined as follows. In one example, the system may determine whether a parent node of a document node is a node for text, such as checking whether a parent node includes a label representing a paragraph of text, such as label <p> or <font>. The system may also determine whether the brother nodes (of the image DOM node) include at least two other content nodes, such as a text node, a <br> node, or an image node. If a parent node of a document node is a node for text including a label <p> or <font>, or if the brother nodes (of the image DOM node) include at least two other content nodes, such as a text node, a <br> node, or an image node, then the system may determine that an image is inserted into a large body of text. If not, the system may determine that the image is not inserted into a large segment of text.

After the first determination unit 930 determines whether an image is inserted into a large segment of text, the second determination unit 940 may determine whether the webpage display width is within a pre-determined range. The pre-determined range may be based on a mobile terminal's screen width. When the mobile terminal's screen width changes, the pre-determined range also changes.

If an image's default display width is within the pre-determined range, the screen size adjustment unit 950 may adjust the display size of the image based on the mobile terminal's screen width. In one example, the screen size adjustment unit 950 may include a width adjustment module (not shown), which may set the image display width to the mobile terminal's screen width subtracting a fixed number of pixels. The screen size adjustment unit 950 may include a height adjustment module (not shown), which may adjust the height of the screen display proportionally to its width.

After the screen size adjustment unit 950 adjusts the screen size, the label addition unit 960 may add a label to the node of the image to indicate that the image should be left justified when displayed.

FIG. 9 shows an embodiment of the system/apparatus for adjusting webpage layout. Other embodiments of the disclosure will be apparent to those skilled in the art from considerations of the specification and practice of the invention disclosed herein.

Embodiments consistent with the present disclosure may adjust the images on a webpage based on the screen width. As such, a webpage can be viewed by scrolling up and down the display screen. A user does not need to scroll horizontally (e.g., from left to right) to view the webpage including the images. In addition, the user's online experience may be further improved by adjusting the images on a webpage to be left justified on the screen, aligned with the text.

Figure 10:
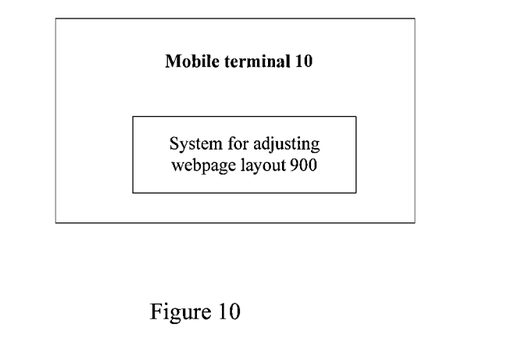
FIG. 10 is another block diagram of an exemplary computer system consistent with the disclosed embodiments.

FIG. 10 is a block diagram for a mobile terminal 10 implementing embodiments consistent with the present disclosure. In FIG. 10, the mobile terminal 10 includes the system/apparatus for adjusting webpage layout 900 shown in FIG. 9. The mobile terminal 10 may also include various modifications of the system/apparatus for adjusting webpage layout 900.

In addition, a mobile terminal may be any terminal, such as a mobile phone, a PDA, etc. The present disclosure is not limited to any specific types of mobile terminals. Embodiments consistent with the present disclosure may be implemented by computing devices with a CPU, which implements the functions for adjusting webpage layout. Embodiments consistent with the present disclosure may be implemented by computing devices with controllers such as a processor that may execute software programs and process data stored in a storage medium.

It should also be obvious that the storage medium used by the computing device implementing embodiments consistent with the present disclosure may be volatile or non-volatile memories, or a combination thereof. Exemplary non-volatile memories may include ROM, PROM, EPROM, EEPROM, or flash memory. Exemplary volatile memories may include RAM, which may act as an external cache. Exemplary RAM may include SRAM, DRAM, SDRAM, DDR SDRAM, ESDRAM, SLDRAM, and DRRAM. Storage devices used to implement embodiments consistent with the present disclosure include but are not limited to the examples above.

Persons of ordinary skill in the art would understand that the software or hardware modules described in the present disclosure may be implemented by software components, hardware component, or any combination thereof. To show the exchangeability of certain software and hardware modules, the embodiments of the present disclosure are described generally. The specific software and/or hardware combination that can be used to implement the embodiments consistent with the present disclosure may be determined by specific system design constraints. Other embodiments of the disclosure will be apparent to those skilled in the art from considerations of the specification and practice of the invention disclosed herein.

The logic modules of the embodiments consistent with present disclosure may be implemented by: a general purpose processor, a DSP, an ASIC, an FPGA, or other programmable logic devices, discrete gate or transistor logic hardware components, or any combination thereof. A general purpose processor may be a microprocessor, or any other traditional processor, controller, micro-controller, or state machine. A processor may be a combination of computing devices, such as a combination of a DSP and a microprocessor, multiple micro-processors, one or more DSP cores, or other similar devices.

The methods implemented by embodiments consistent with the present disclosure may be implemented by hardware components, or software programs that can be executed by a processor. Software modules may be stored in RAM storage, flash memory storage, ROM, EPROM, EEPROM, registers, hard disks, removable disks, CD ROM, or other similar storage mediums. Exemplary memories may be coupled with processors so that the processors may read and write data from and to the memories. In one example, a memory may also be integrated with a processor. A processor and a memory may reside in an ASIC. An ASIC may reside in a user terminal. In another example, a processor and a memory can be separate components in a user terminal.

Persons of ordinary skill in the art would understand that the software or hardware modules described in the present disclosure may be implemented by software components, hardware component, or any combination thereof. If implemented by software components, the software code and instructions may be stored and transmitted through computer readable medium. The computer readable medium may include storage medium and communication medium. The communication medium may include any computer readable medium that can facilitate the transmission of computer code. The storage medium may be any computer medium that can be accessed by a general or specific computer. Exemplary computer readable medium may include RAM, ROM, EEPROM, CD-ROM, or other optic disks, magnetic disks, other magnet storage devices, or other portable storage medium. In addition, any connection may be considered computer readable medium. For example, if a website or a server uses a coaxial cable, fiber optic cable, twisted pair cable, digital subscriber line (DSL), or infrared, radio, and microwave wireless technologies to send software code or instructions, these network connections are computer readable medium. Further, magnetic disks and optical disks including CDs, laser disks, DVDs, floppy disks, blue ray disks, which store and reproduce data using magnetic and laser technologies, are also computer readable medium.

Consistent with embodiments of the present disclosure, one or more non-transitory storage medium storing a computer program are provided to implement the system and method for adjusting webpage layout. The one or more non-transitory storage medium may be installed in a computer or provided separately from a computer. A computer may read the computer program from the storage medium and execute the program to perform the methods consistent with embodiments of the present disclosure. The storage medium may be a magnetic storage medium, such as hard disk, floppy disk, or other magnetic disks, a tape, or a cassette tape. The storage medium may also be an optical storage medium, such as optical disk (for example, CD or DVD). The storage medium may further be semiconductor storage medium, such as DRAM, SRAM, EPROM, EEPROM, flash memory, or memory stick.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A method for adjusting webpage layout, comprising:
    calculating a width for displaying an image on a webpage;
    determining whether the image is inserted in a segment of text of the webpage, including checking whether a parent node of the image includes a label representing a paragraph of text;
    adjusting a size of the image display based on a mobile terminal's screen width and the width for displaying the image, if the image is inserted in the segment of text of the webpage, including:
        setting a width of the image display to the mobile terminal's screen width subtracting a fixed number of pixels, and setting a height of the image display based on the width of the image display; and
    adding a label to the image display to force the image display to be left justified, while ignoring label attributes including at least one of text-align, indent, and margin.

2. The method according to claim 1, further comprising:
    determining whether the image display needs to be adjusted;
    determining whether the width for displaying the image is different from a default value; and
    determining whether the screen width of the mobile terminal has changed.

3. The method according to claim 1, wherein determining whether the image is inserted in a segment of text of the webpage further comprises:
    determining whether the image includes an attribute that is needed for actively displaying the image.

4. The method according to claim 1, wherein determining whether the image is inserted in a segment of text of the webpage further comprises:
    determining whether at least two brother nodes of the image are nodes representing other contents.

5. The method according to claim 1, further comprising:
    adjusting the size of the image display based on whether a width of the image display is in a pre-determined range.

6. The method according to claim 5, further comprising:
    using the pre-determined range to filter out small images or images with large website logos or advertisements;
    wherein the pre-determined range is from 120 pixels to 950 pixels.

7. The method according to claim 6, further comprising:
    when the mobile terminal changes from a vertical display to a horizontal display, increasing a lower limit of the pre-determined range.

8. The method according to claim 1, wherein the fixed number of pixels is 20.

9. The method according to claim 1, further comprising:
    determining that the image on the website is properly centered, followed by adding the label to the image display to force the image display to be left justified.

10. A system for adjusting webpage layout, comprising one or more processors, memory, and one or more program units stored in the memory and to be executed by the one or more processors, the one or more program units comprising:
    a calculation unit configured to calculate a width for displaying an image on a webpage;
    a first determination unit configured to determine whether the image is inserted in a segment of text of the webpage by checking whether a parent node of the image includes a label representing a paragraph of text;
    a size adjustment unit configured to adjust a size of the image display based on a mobile terminal's screen width and the width for displaying the image, if the image is inserted in the segment of text of the webpage, wherein the size adjustment unit includes:
        a width adjustment module configured to set a width of the image display to the mobile terminal's screen width subtracting a fixed number of pixels; and a height adjustment module configured to set a height of the image display based on the width of the image display; and a label addition unit configured to add a label to the image display to force the image display to be left justified, while ignoring label attributes including at least one of text-align, indent, and margin.

11. The system according to claim 10, the one or more program units further comprising:
a webpage adjustment confirmation unit configured to determine whether the image display needs to be adjusted;
wherein the first determination unit is further configured to determine whether the width for displaying the image is different from a default value, or whether the screen width of the mobile terminal has changed.

12. The system according to claim 10, wherein the first determination unit is further configured to determine whether the image includes an attribute that is needed for actively displaying the image before determining whether the image is inserted in a segment of text of the webpage.

13. The system according to claim 11, wherein the first determination unit is further configured to determine whether at least two brother nodes of the image are nodes representing other contents.

14. The system according to claim 10, the one or more program units further comprising:
a second determination unit configured to determine whether a width of the image display is in a pre-determined range, and based on the pre-determined range, to filter out small images and images with large website logos or advertisements.

15. The system according to claim 10, wherein:
the label addition unit is further configured to determine that the image on the website is properly centered, then to add the label to the image display to force the image display to be left justified.

16. A mobile terminal including a system for adjusting webpage layout, the system comprising one or more processors, memory, and one or more program units stored in the memory and to be executed by the one or more processors, the one or more program units comprising:
a webpage adjustment confirmation unit configured to determine whether an image display needs to be adjusted;
a calculation unit configured to calculate a width for displaying the image on a webpage;
a first determination unit configured to determine whether the image is inserted in a segment of text of the webpage by checking whether a parent node of the image includes a label representing a paragraph of text;
a size adjustment unit configured to adjust a size of the image display based on a mobile terminal's screen width and the width for displaying the image if the image is inserted in a segment of text of the webpage, wherein the size adjustment unit includes:
a width adjustment module configured to set a width of the image display to the mobile terminal's screen width subtracting a fixed number of pixels; and a height adjustment module configured to set a height of the image display based on the width of the image display; and
a label addition unit configured to add a label to the image display to force the image display to be left justified, while ignoring label attributes including at least one of text-align, indent, and margin.

17. A non-transient computer medium containing program instructions for causing a computer to perform a method for adjusting webpage layout, the method comprising:
calculating a width for displaying an image on a webpage;
determining whether the width for displaying the image is different from a default value;
determining whether the screen width of the mobile terminal has changed;
determining whether the image is inserted in a segment of text of the webpage, including checking whether a parent node of the image includes a label representing a paragraph of text;
adjusting a size of the image display based on a mobile terminal's screen width and the width for displaying the image, if the image is inserted in the segment of text of the webpage, including:
setting a width of the image display to the mobile terminal's screen width subtracting a fixed number of pixels, and setting a height of the image display based on the width of the image display; and
adding a label to the image display to force the image display to be left justified, while ignoring label attributes including at least one of text-align, indent, and margin.

* * * * *